Figure 1:
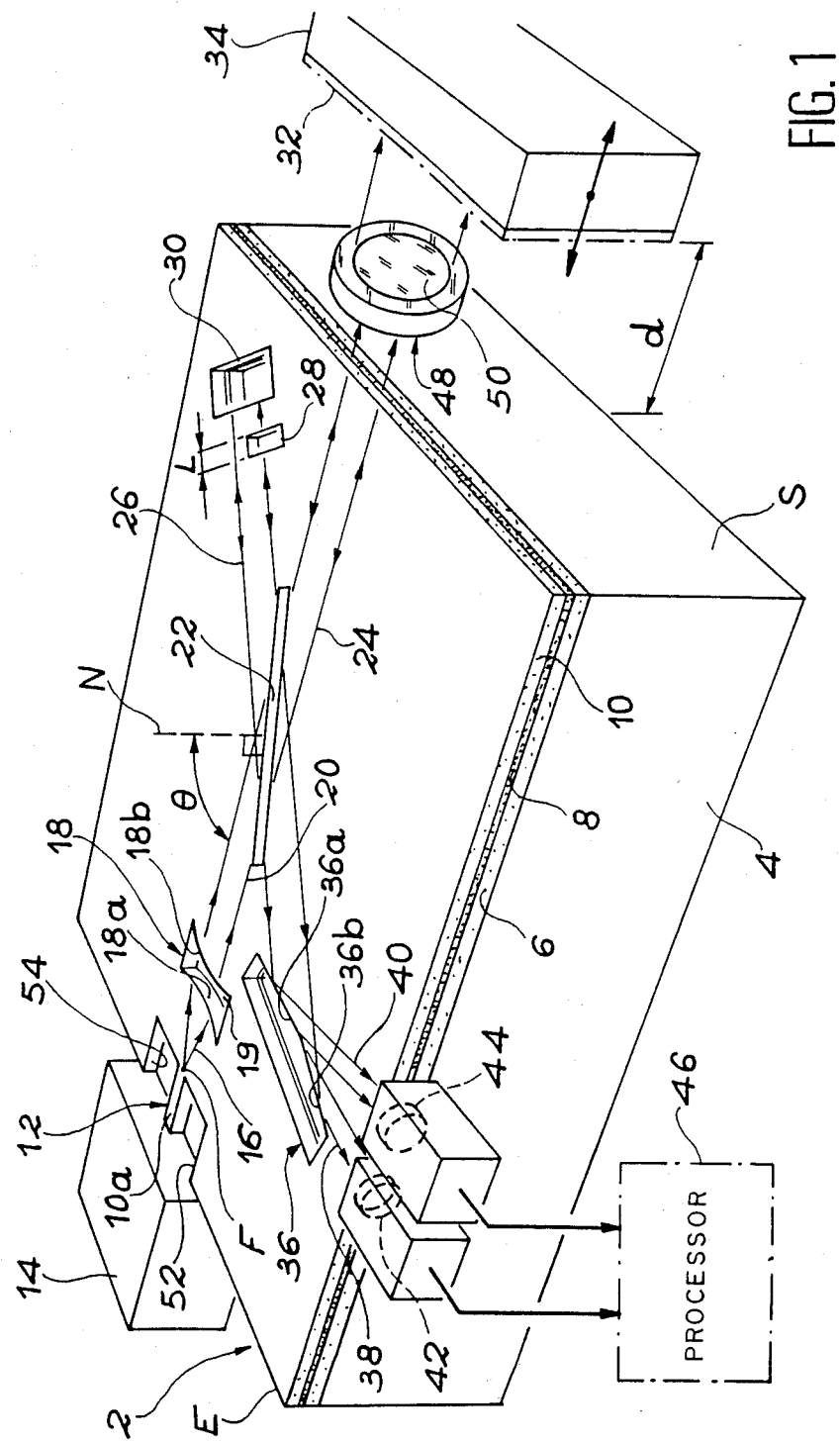

United States Patent [19]
Gidon et al.

[11] Patent Number: 4,865,453
[45] Date of Patent: Sep. 12, 1989

[54] DISPLACEMENT TRANSDUCER IN INTEGRATED OPTICS

[75] Inventors: Pierre Gidon, Echirolles; Jacques Lizet; Serge Valette, both of Grenoble, all of France

[73] Assignee: Commissariat a l'Energie Atomique, Paris, France

[21] Appl. No.: 174,827

[22] Filed: Mar. 29, 1988

[30] Foreign Application Priority Data

Apr. 7, 1987 [FR] France .................. 87 04877

[51] Int. Cl.$^4$ ............................................ G01B 9/02
[52] U.S. Cl. ................................ 356/358; 350/96.11
[58] Field of Search .............................. 356/4.5, 358; 350/96.11, 96.12

[56] References Cited

U.S. PATENT DOCUMENTS 4,324,492  4/1982  Drenckhan et al.
4,717,255  1/1988  Ulbers ........................... 356/358 X
4,744,661  5/1988  Ulbers et al. ....................... 356/358

FOREIGN PATENT DOCUMENTS 198735  10/1986  European Pat. Off.

OTHER PUBLICATIONS

Technischens Messen T. M., 52 (1985) No. 9, pp. 321–326.

Primary Examiner—Davis L. Willis
Assistant Examiner—Matthew W. Koren
Attorney, Agent, or Firm—Nutter, McClennen & Fish

[57] ABSTRACT

A displacement transducer in integrated optics comprises a light source emitting a main monochromatic beam, a lens for collimating the main beam, a splitting plate for forming a measuring beam and a reference beam, a phase displacer for introducing a phase displacement of $\pi/2$ on part of the reference beam in order to form two reference beams, a first mirror integral with the moving object and a second mirror respectively serving for reflecting the measuring beam and the two reference beams on to the splitting plate, so as to form two interference signals, a splitting mirror for splitting these two interference signals and two detectors for respectively detecting these two interference signals. The transducer is formed in a $SiO_2/Si_3N_4/SiO_2$ optical guide, the lens, plate and phase displacer being formed by local etching of the surface layer of the guide, the second mirror and the splitting mirror being formed by total etching of the guide.

10 Claims, 3 Drawing Sheets

DISPLACEMENT TRANSDUCER IN INTEGRATED OPTICS

DESCRIPTION

The present invention relates to a displacement transducer for measuring the displacement of an object, as well as for determining the displacement direction of said object. This transducer is intended to operate in integrated optics structures.

The invention can be used in all fields where it is wished to know the distance covered by a moving object, as well as its displacement direction and in particular in the space, avionics, naval and robotics fields, or on the assembly lines for a large number of different objects (automobiles, electric household equipment, food conditioning, etc.) and in general terms in dimensional metrology.

Information remote transmission and/or processing methods which have been studied for a number of years use transmission by lightwaves in planar structure light guides. These light guides are constituted by a guide layer, placed between two media having refractive indexes or indices below that of the guide layer. Air is generally one of the two media.

With each optical guide is associated an effective index $n_e = c/v$, in which v represents the light phase speed in the guide layer and c is the speed of light in vacuum. The value of the effective index is dependent on the value of the different indexes of the layers constituting said guide, as well as the thickness thereof. Thus, in integrated optics, the speed of a light wave can be modified either by variations to the index of the different layers present, or by varying their thickness.

Through the transposition of these phenomena known from conventional optics, an attempt has been made to produce in the form of integrated components structures equivalent to the conventional structures in order to permit the propagation of light. These integrated structures have the advantage of limited overall dimensions, which permits the use thereof in presently unused places or fields.

The displacement transducer to which the invention relates is a Michelson-type interferometer based on the analysis of the interference system between a reference beam and a measuring beam, the latter being reflected by a mirror integral with the moving object to be investigated. The displacement of a moving object is generally determined by counting the interference fringes, the distance covered by the moving object being, for a given wavelength, directly proportional to the number of fringes of the interference system.

The known Michelson interferometers, in conventional optics, make use of a single reference beam and a single measuring beam. In most cases, this arrangement is adequate for measuring the distance covered by a moving object and for determining its displacement direction. However, the inventors have found that under certain operating conditions, it is possible to make an error with regards to the displacement direction of the moving object. This is in particular the case when the moving object stops and then starts up again in a direction opposite to the first displacement and said change of direction takes place when the detection is performed on a maximum or minimum of interference fringes.

The invention therefore relates to a displacement transducer making it possible to measure the distance covered by a moving object and to reliably determine its displacement direction, no matter what the analysis conditions of the interference system. Moreover, this displacement transducer is produced in integrated form.

More specifically, the present invention relates to a transducer of the Michelson-interferometer type in integrated optics used for measuring the distance covered by a moving object and for determining the displacement direction of said moving object having:

a light source emitting a main monochromatic light beam, means for collimating the main beam, first means for splitting the main collimated beam to form a measuring beam and a reference beam, a first mirror integral with the moving object for reflecting the measuring beam onto the first splitting means, phase displacement means for introducing a constant phase displacement, differing from $\pi$, over part of the reference beam, in order to form first and second phase displaced reference beams, a second mirror for reflecting the first and second reference beams onto the first splitting means in order to bring about respective interference of the first and second reference beams with the measuring beam and thus form first and second interference light signals, said signals representing the displacement of the moving object and its displacement direction, second splitting means for splitting the first and second interference signals, first and second detectors for respectively detecting the first and second interference signals, said transducer, partly integrated onto a monocrystalline substrate, also having a light guide of effective index $n_e$ formed on the substrate and in which the different light beams propagate. In this case, the collimating means, first splitting means and phase displacement means are respectively formed by a local and appropriate modification of the effective index of the light guide. Moreover, the first mirror and the second splitting means are respectively formed by an etched flank of the light guide extending over the entire height thereof up to the substrate.

In the case of a moving object having at least one reflecting part, said part can constitute the first mirror.

The inventive use of two interference systems makes it possible to remove any possible ambiguity regarding the displacement direction of the moving object, when said direction is determined on a maximum or a minimum of one of the two interference signals. Thus, the analysis on a maximum or minimum of the interference signal cannot exist at the same time on both interference systems, because the latter are phase displaced by a value differing from $\pi$. The phase displacement introduced between the first and second reference beams is in particular equal to $\pi/2$.

The local modifications of the effective index of the optical guide can be realized by locally implanting ions in one of the layers of the guide, by locally modifying the thickness of one of the layers, by locally etching the surface layer of the guide and/or by locally changing the nature of one or other of the guide layers. The local modifications of the effective index of the guide can consist of an increase or a decrease of a local nature of the effective index of the guide.

Advantageously, the light guide of the transducer according to the invention successively comprises starting from the substrate, a continuous layer of a first material, a continuous layer of a second material and a layer of a third material having etched patterns constituting local modifications of the effective index of the light guide, the second material having a higher refractive index than that of the first and third materials.

The transducer according to the invention can be advantageously produced in silicon or III-V technology (GaAs or InP), said technologies being satisfactorily exploited in integrated optics.

Preferably, the first and third materials are pure silica, the second material is silicon nitride and the substrate is silicon.

The use of pure silica as the surface layer of the optical guide (third material) is particularly interesting bearing in mind its good optical quality and its excellent anisotropic etching possibilities. Pure silica has a refractive index close to 1.45. In the same way, the use of silicon nitride as the second material is particularly interesting as a result of its high refractive index (close to 2).

However, other materials can be used for forming the different layers of the optical guide, such as alumina with a refractive index of 1.65, different types of glass having refractive indexes between 1.5 and 1.8, as well as phosphorusdoped silica with refractive indexes up to 1.49, or titaniumdoped silica.

In the case of patterns etched in the surface layer of the optical guide, the local variations of the effective index of said guide are particularly due to the presence of air as the upper material of the light guide, air having the lowest refractive index of the dielectrics.

It is also possible to locally modify the effective index of the light guide by filling with a fourth material the etched patterns of the surface layer of the guide, said fourth material having a refractive index below that of the third material and below that of the second material. This fourth material can be deposited by sputtering or by chemical vapor phase decomposition.

In the case of a silica surface layer and a silicon nitride guide layer, the fourth material can be constituted by magnesium fluoride ($MgF_2$), said material having a refractive index of 1.38 (below those of $SiO_2$ and $Si_3N_4$).

The collimating means of the main beam can be constituted by a lens, whose shape is dependent on the focal distance to be obtained and the type of aberrations to be minimized. This lens can be obtained by reactive ionic etching of the surface layer of the optical guide and can have two diopters in the form of an ellipse or hyperbola, which corresponds respectively to an increase and a decrease of the effective index of the optical guide. This lens can also be an integrated Fresnel lens, as described in US-A-4 445 759 and EP-A-0 050 545.

It is also possible to produce the collimating means in the form of a parabolic mirror, as described in EP-A-0 196 948.

The first splitting means can be formed by a splitting mirror or a splitting plate. The latter can be simply constituted by a groove etched in the surface layer of the optical guide or can advantageously be produced by a diffractive grating.

The first mirror and the second splitting means are obtained by etching the entire height of the optical guide by reactive ionic etching. In order to improve their reflection characteristics, the corresponding etched flanks can be covered with a metallic coating. The detectors can be constituted by a photomultiplier or by photodiodes attached to the monocrystalline substrate at the transducer output. It is also possible to produce these detectors in the form of a photodetector integrated on to the monocrystalline substrate and as described in EP-A-0 198 735.

In integrated optics, the measuring beam leaving the optical guide is, as a result of the dimensions of the latter and consequently the width of the guided mode, highly diffracted. However, this diffraction limits the dynamics of the measurement.

In order to reduce the effects of said diffraction, it is advantageous to provide an optical element between the first splitting means and the second mirror making it possible to increase the width of the guided mode. This optical element is e.g. formed by a reduction in the thickness of the guide layer of the optical guide (second material), or a facing cylindrical lens and at a distance from the guide layer of the guide, constituted e.g. by an optical fiber, whose diameter exceeds the thickness of the guide layer.

With a view to ensuring a good coupling between the monochromatic light source and the collimating means of the beam emanating from the source, use is advantageously made of an input microguide formed on the monocrystalline substrate and inserted between the source and said collimating means.

Other features and advantages of the invention can be better gathered from the following description given in an illustrative and non-limitative manner, with reference to the attached drawings, wherein show:

FIG. 1; Diagrammatically and in perspective a displacement transducer according to the invention.

Figure 2:
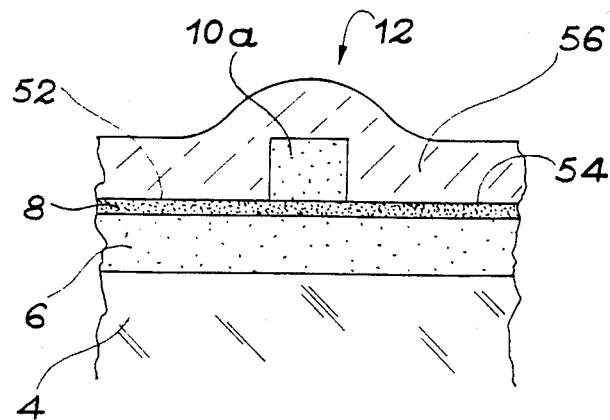

FIG. 2; In cross-section a variant of the input microguide of the displacement transducer according to the invention.

Figure 3:
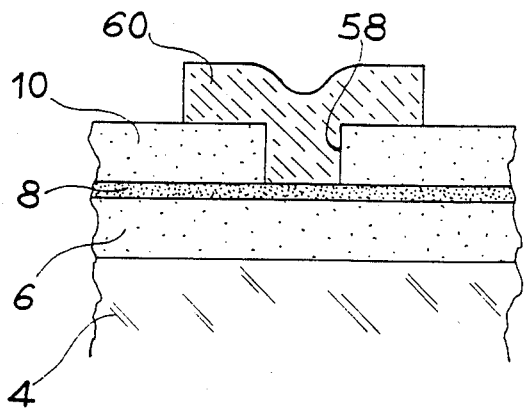

FIG. 3; In cross-section another variant of the input microguide of the transducer according to the invention.

Figure 4:
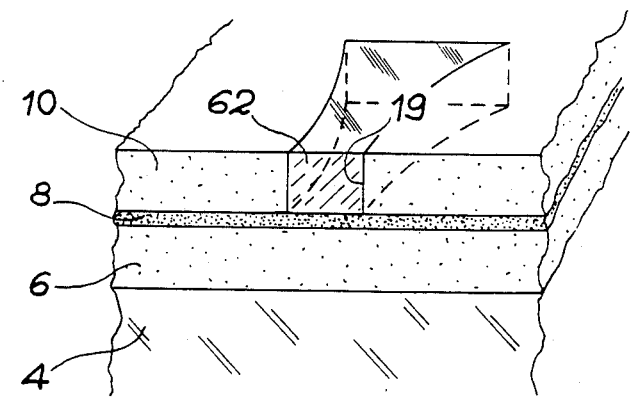

FIG. 4; In perspective a variant of the collimating lens of the transducer according to the invention.

Figure 5:
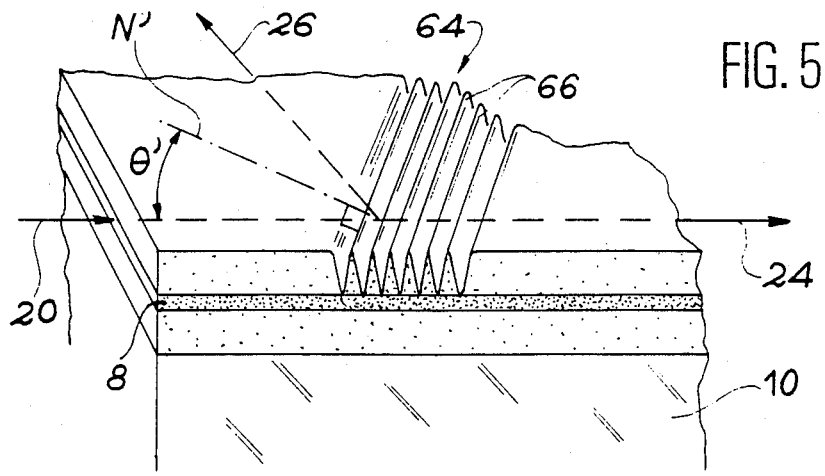

FIG. 5; Diagrammatically and in perspective an embodiment of the splitting plate of the transducer according to the invention.

Figure 6A:
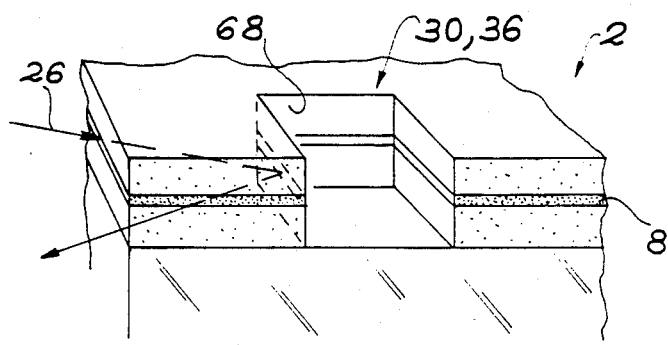
Figure 6B:
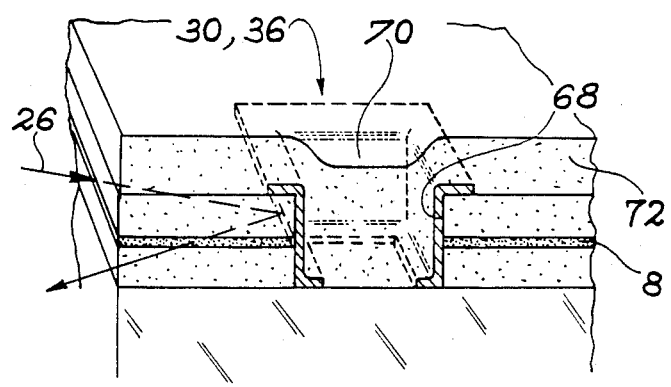

FIGS. 6a and 6b; Two embodiments of integrated mirrors of the displacement transducer according to the invention.

The transducer according to the invention comprises and as shown in FIG. 1, a light guide 2 produced on a silicon, monocrystalline semiconductor substrate 4. The substrate is obtained by cleaving a semiconductor block in order provide strictly parallel input E and output S faces.

The light guide 2 is formed from three superimposed layers 6, 8, 10, starting from the substrate, the layer 8 constituting the guide layer of the optical guide. Layer 8 has a refractive index higher than that of layers 6 and 10. In particular, the lower layer 6 is made from pure silica, guide layer 8 from silicon nitride and the upper layer 10 of pure silica.

The thickness of guide layer 8 is between approximately 10 and 250 nm, so that the light guide is monomodal. The thicknesses of the silica layers 6 and 10 are dependent on those of the nitride layer, being between 1 and 5 $\mu$m in order to ensure a good isolation of the light respectively from absorbing substrate 4 or layer 6 and from the external medium from the upper layer 10.

The silica layer 6 can be obtained by thermal oxidation of the substrate or by chemical vapor phase-deposition, which may or may not be plasma assisted. It is also possible to associate these two methods, because chemical vapor phase deposition (CVD) of a silica layer on a thermally formed silica layer generally has a better optical quality than the same CVD deposit performed directly on the substrate 4. The nitride layer 8 can be obtained by low pressure or plasma assisted chemical vapor phase deposition (LPCVD/PACVD).

The upper layer 6 of guide 10 is produced by plasma assisted vapor phase chemical deposition.

For a wavelength of approximately 800 nm, pure silica has a refractive index of approximately 1.45 and silicon nitride a refractive index of approximately 2.

Into said light guide 2 is integrated most of the optical components of the displacement transducer according to the invention. This displacement transducer has at its input E an input microguide 12 ensuring a good coupling between a monochromatic light source 14, formed by a laser diode and the optical guide 2.

The light beam 16 carried by the input microguide 12 of the transducer reaches a collimating lens 18, which makes it possible to transform the light from the microguide 12, likened to a light point, into a parallel light beam 20. For this purpose, the end of the microguide 12 facing the collimating lens 18 can be located at the focus F of said lens.

The collimated light beam 20 then acts on a splitting plate 22, which can be formed by a single etched groove in the upper layer 10 of the optical guide. This splitting plate 22 permits the formation of a measuring beam 24 and a reference beam 26 respectively obtained by the reflection of the incident beam 20 on plate 22 and the transmission of said same beam by the plate.

The displacement transducer also comprises a phase displacer or shifter 28, placed on the reference beam 26 and only affecting part of said reference beam 26, so as to form two reference beams phase displaced by a constant phase displacement. The phase displacement introduced and which differs from $\pi$ is e.g. equal to $\pi/2$.

The transducer also comprises a plane mirror 30 making it possible to reflect the two reference beams onto the splitting plate 22, as well as a plane mirror 32 located outside the substrate 4 and integral with the moving object 34, whose displacement d is to be measured, while also determining the displacement direction thereof. Mirror 32 makes it possible to reflect the measuring beam 24 into the waveguide and therefore onto the splitting plate 22, so that it interferes with the two reference beams and consequently forms two interference light signals representing the displacement of moving object 34 and its displacement direction.

The two interference systems formed on the splitting plate 22 are received by a splitting mirror 36 having an input face formed from two parts 36a, 36b forming between them an angle between 120° and 180°, giving rise to two separate interference signals 38, 40 respectively detected by two photodetectors 42, 44 attached to substrate 4.

If $a_r$ represents the amplitude of the two reference signals and $a_s$ the amplitude of the measuring signal, the two detectors 42 and 44 receive a light signal having a continuous amplitude background $a_r^2 + a_s^2$, as well as a modulation of this continuous background constituting the interference signals. As the two interference systems are phase displaced by $\pi/2$, the period or cycle of the interference fringes in the two interference systems corresponds to a phase variation of $2\pi$, i.e. the supplementary phase displacement of the interference signals is due to the displacement of the moving object $(2\pi/\lambda_0).2d = 2\pi$, in which d is the distance covered by the moving object and $\lambda_0$ is the wavelength of the monochromatic incident beam 20. The factor 2 before d is due to the outward and return path of the measuring beam between the substrate face S and mirror 32, which corresponds to a displacement $d = \lambda_0/2$.

Between a maximum and a minimum of the modulation signal, there is consequently a phase displacement of $\pi$ and a displacement of $\lambda/4$.

By counting the interference fringes of the two systems, it is possible to obtain the displacement value. If N fringes are counted, the displacement d is equal to $N\lambda_0/2$.

With the aid of an appropriate electronic processing device 46 connected to the two photodetectors 42 and 44, it is possible to evaluate an interference fringe fraction. Moreover, it is possible to use a phase displacement differing from $\pi/2$ between the two reference beams.

The displacement or movement direction of the object is given by the slope or gradient of the modulation signal. When the moving object moves, stops and then starts up again in the same direction, the slope of the modulation signal remains of the same sign. Conversely, if the moving object changes direction, the slope of the modulation signal changes sign and it is possible to see a cuspidal point which can be revealed even if the slope of the signal is zero on a detector, i.e. even if the change of direction of the moving object has taken place at an interference maximum or minimum on one of the interference systems, because it will then be non-zero for the other detector.

The processing system 46 used for the evaluation of a fraction of the fringes, the use of a phase displacement differing from $\pi/2$ and/or for the detection of the displacement direction of the moving object by an appropriate combination of these two interference signals is well known in the art and forms the object of various publications, e.g. the article entitled "Liquid Level Interferometer" by S. F. JACOBS and J. G. SMALL, Applied Optics, vol. 20, no. 20, pp. 3508–3513 of 15.10.1981.

Bearing in mind the limited thickness of the guide layer 8, the measuring beam 24 leaving the latter is generally highly diffracted. In order to limit said diffraction to the greatest possible extent, an optical fiber 48 is placed between the splitting plate 22 and the mirror 32, outside the optical guide, or use is made of a higher performance collimating system.

According to the invention, the input guide 12, collimating lens 18, splitting plate 22 and phase displacer 28 integrated onto the same substrate 4 are produced so as to locally modify the value of the effective index of optical guide 2.

The input microguide 12 can be formed by making two openings 52, 54 in the surface layer 10 of the optical guide, the silica 10a remaining between the two openings 52 and 54 then constituting the input microguide. Openings 52 and 54 can be produced by reactive ionic etching using a carbon tetrafluoride or trifluoromethane plasma as the etching agent. This anisotropic etching is carried out over the entire thickness of the silica layer 10.

It is also possible to produce the optical guide as shown in FIG. 2 by depositing above the silica stud 10a and openings 52, 54, a dielectric 56 having a refractive index lower than that of pure silica, such as $MgF_2$.

It is also possible to produce the input microguide in the manner shown in FIG. 3. In this case, reactive ionic etching of the surface layer 10 of the optical guide takes place over the entire thickness of layer 10, so as to form an opening 58, which is filled with a dielectric 60 having a refractive index higher than that of the silica constituting layer 10, e.g. alumina. In this case, the microguide dimensions are defined by the dimensions of opening 58, whereas in the embodiments of FIGS. 1 and 2, the microguide dimensions are determined by the remaining silica stud 10a.

As shown in FIG. 1, the collimating lens 18 can be produced by simple anisotropic etching of the surface layer 10, the dimensions and shape of the opening 19 made in the silica layer 10 defining the dimensions and optical properties of the lens.

In order to obtain good collimating characteristics on the part of lens 18, it is necessary to perfectly control the etching depth of the silica layer 10, as well as the shape of the diopters 18a, 18b constituting said lens.

For this purpose, use is made of reactive ionic etching using as the etching agent a trifluoromethane plasma as the etching agent and this is carried out over a thickness of a few nanometers. Etching is completed by chemical etching in a mixture of HF-FNH$_4$, which does not act on the silicon nitride constituting the guide layer 8 and which makes it possible to obtain a very good control of the local modification of the effective index of guide 2. This etching is carried out in a conventional manner through an etching mask defining the shape and precise dimensions of the lens 18 to be produced.

Optionally and as shown in FIG. 4, the opening 19 made in layer 10 and defining the dimensions of lens 18 can be filled with a dielectric 62 having a refractive index below that of silica, such as MgF$_2$. However, it is preferable to use a simple etching of the silica for constituting lens 18, so as to obtain a more significant effective index difference of the guide (bearing in mind the index differences between air and silica) and consequently to form diopters 18a, 18b with a small radius of curvature, which corresponds to a large aperture lens.

The splitting plate 22 (FIG. 1) is also produced by reactive ionic etching of the silica layer 10 with CHF$_3$.

In order that the intensity of the measuring beam 24 and that of the reference beam 26 are identical, which corresponds to a reflection and transmission coefficient of plate 22 close to 50%, it is necessary that the angle $\theta$ formed by the instant beam 20 with respect to the normal N to the splitting plate 22 is close to the total reflection angle $\theta_t$ given by the relation $\theta_t = \text{Arsin}/n_{e2}/n_{e1})$, in which $n_{e1}$ represents the effective index of the SiO$_2$/Si$_3$N$_4$/SiO$_2$ guide and $n_{e2}$ represents the effective index of the air/Si$_3$N$_4$/SiO$_2$ guide. This approach only applies if $n_{e1} - n_{e2}$ is greater than zero.

The width of the splitting plate 22 is calculated by using a conventional optics calculation where the effective indexes replace the real indexes. Experience has shown that this approach gives good results. e can e.g. be approximately 2.5 μm for an angle $\theta_t$ close to 78°. However, with an index difference $n_{e1} - n_{e2}$ close to $4 \cdot 10^{-2}$, an angle $\theta$ close to 78° is obtained, which is relatively large and can be a disadvantage with regards to the overall dimensions of the transducer.

It is also possible to produce the splitting plate in the form of a diffractive grating 64, as shown in FIG. 5 operating under Bragg conditions.

The transmission and reflection coefficients of grating 64 are calculated by limiting the number of lines 66 of said grating. A transmission and reflection coefficient equal to 50% is obtained with the aid of a grating having 10 to 20 lines.

This grating can be produced by locally etching, through an appropriate etching mask obtained according to conventional photolithography processes, the silica layer 10 of the optical guide. Etching is carried out anisotropically using a reactive ionic etching process.

The use of a diffraction grating makes it possible to obtain angle $\theta$ of the incident beam with respect to the normal N' to the lines of the grating further removed from $\pi/2$ than in the case of a splitting plate formed by a single groove (FIG. 1). In addition, the grating is less sensitive to possible overetchings or underetchings of the silica layer 10. However, it is much more sensitive to the wavelength $\lambda_0$ of the incident beam 20 than when a single groove is used.

It is also possible to make the diffractive grating 64 operate at an order above 10 and e.g. at 3 or 5. This makes it possible to increase by 3 or 5 times the pitch of the grating for the same angle $\theta'$ and therefore to facilitate its construction. For a grating operating at order 1, there is a pitch or spacing of approximately 600 nm, which is 1800 nm for a grating operating at order 3. In this case, angle $\theta'$ can be below 78° leading to smaller overall dimensions than the single groove (FIG. 1). However, it must necessarily exceed a limit angle $\theta''$, so as not to have an energy loss by diffraction by the lower orders of the grating. In the SiO$_2$/Si$_3$N$_4$/SiO$_2$ structure, with a silicon nitride thickness of 0.165 μm, $\theta''$ is approximately 55° at $\lambda_0 = 632.8$ nm, so that it is easily possible to work at $\theta' = 60°$.

As shown in FIG. 1, the phase displacer 28 is also formed by a single groove etched in the entire thickness of surface layer 10 of the optical guide. The width L of said phase displacer is calculated in such a way that $(2\pi/\lambda_0)L(n_{e1} - n_{e2}) = \pi/4$, because the reference light beam traverses said phase displacer 28 twice. L is typically approximately a few micrometers for a phase displacer formed by a simple etching of layer 10.

As shown in FIGS. 6a and 6b, mirrors 30 and 36 can be produced by a complete etching of optical guide 2 up to the substrate. This etching is preferably realized by reactive ionic etching using CF$_4$, CHF$_3$, C$_2$F$_4$ or SF$_6$ for layers of silica and silicon nitride in order to obtain perfectly anisotropic etched flanks 68.

In order to improve their reflection characteristics, it is possible to cover the etched flank 68 with a coating of gold or aluminium 70, as shown in FIG. 6b.

In this particular case, a layer 72 can then be deposited on the entire guide, so as to more particularly improve the properties of microguide 12 and ensure a mechanical protection of the mirrors. This layer 72 can be of CVD-deposited pure silica, a polyimide or a silica gel known as "spin on glass".

The above description has purely been given in an illustrative manner and numerous variants can be envisaged without passing beyond the scope of the invention. In particular, it is possible to change the nature of the layers of the optical guide, so as to locally modify the effective index thereof, as well as to change the construction of the different components of the transducer. For example, it is possible to use as the upper layer of the optical guide a dielectric with a refractive index higher than that of pure silica, but lower than that of the e.g. nitride guide layer. In this case, the different components could be produced by etching said dielectric layer.

We claim:

1. Transducer in integrated optics used for measuring the distance covered by a moving object and for determining the displacement direction of said moving object (34) having:
   a light source (14) emitting a main monochromatic light beam (16),
   means for collimating (18) the main beam,
   first means for splitting (22, 64) the main collimated beam (24) to form a measuring beam and a reference beam (26),
   a first mirror (32) integral with the moving object (34) for reflecting the measuring beam (24) onto the first splitting means,
   phase displacement means (28) for introducing a constant phase displacement, differing from $\pi$, over part of the reference beam (26), in order to form first and second phase displaced reference beams,
   a second mirror (30) for reflecting the first and second reference beams onto the first splitting means in order to bring about respective interference of the first and second reference beams with the measuring beam and thus form first and second interference light signals (38, 40), said signals representing the displacement of the moving object and its displacement direction,
   second splitting means (36) for splitting the first and second interference signals,
   first and second detectors (38, 40) for respectively detecting the first and second interference signals, said transducer, partly integrated onto a monocrystalline substrate (4), also having a light guide (2) of effective index $n_e$ formed on the substrate and in which the different light beams propagate, the collimating means (18), first splitting means (22, 64) and phase displacement means (28) then being respectively formed by an appropriate local modification of the effective index of the light guide and the first mirror (32) and second splitting means (36) are respectively formed by an etched flank of the light guide extending up to the substrate.

2. Transducer according to claim 1, characterized in that the phase displacement introduced between the first and second reference beams is equal to $\pi/2$.

3. Transducer according to claim 1 or 2, characterized in that the light guide (2) successively comprises, starting from the substrate (4), a continuous layer of a first material (6), a continuous layer of a second material (8) and a layer (10) of a third material having etched patterns (18, 19, 22, 28, 58) constituting local modifications of the effective index of the light guide, the second material having a refractive index higher than that of the first and third materials.

4. Transducer according to claim 3, characterized in that the first and third materials are of pure silica, the second material of silicon nitride and the substrate is of silicon.

5. Transducer according to claim 3, characterized in that the etched patterns (19, 58) are filled by a fourth material (60, 62) having a refractive index differing from that of the third material.

6. Transducer according to claim 1 or 2 characterized in that the first splitting means are formed by a diffractive grating (64) operating at order 1 or a higher order.

7. Transducer according to claim 1 or 2 characterized in that the etched flank (68) is covered by a metallic coating (70).

8. Transducer according to claim 1 or 2 characterized in that it comprises an input microguide (12) formed on substrate (4) and inserted between the light source (14) and the collimating means (18).

9. Transducer according to claim 1 or 2 characterized in that it comprises, between the first splitting means (22) and the second mirror (32), an optical element (50) for limiting the diffraction effects of the measuring beam emanating from the light guide.

10. Transducer according to claim 3 characterized in that the patterns and/or etched flanks are obtained by means of reactive ionic etching.

* * * * *